United States Patent Office 3,795,626
Patented Mar. 5, 1974

3,795,626
WEATHER MODIFICATION PROCESS
Rudolf Kuhne, Frankfurt am Main, Helmut Diery, Kelkheim, Taunus, and Siegbert Rittner, Frankfurt am Main, Germany, assignors to Farbwerke Hoechst Aktiengesellschaft vormals Meister Lucius & Bruning, Frankfurt am Main, Germany
No Drawing. Filed Aug. 31, 1971, Ser. No. 176,695
Claims priority, application Germany, Sept. 2, 1970, P 20 43 519.2
Int. Cl. B01d 17/00
U.S. Cl. 252—319    3 Claims

ABSTRACT OF THE DISCLOSURE

Condensation products of naphthalene sulfonic acids and aliphatic aldehydes or furfural or compounds capable of setting free such aldehydes are effective in influencing the weather, i.e. they remove fog or clouds or cause rain.

---

The present invention relates to a process and to agents having an influence on the weather.

It is known that the autumn and winter months are an especially critical period for civil air traffic because of the formation of fog. Despite many attempts to dispel the fog by physical, chemical and mechanical means, a satisfactory solution of this problem has not yet been found. Surface-active agents as described in German Pat. No. 956,278 and in U.S. Pat. No. 2,962,450 have neither been suitable for solving the fog-dispelling problem.

Now, it was found that water-soluble condensation products of naphthalene sulfonic acid and aliphatic aldehydes and furfural or compounds capable of splitting off such aldehydes have properties influencing the weather, which means herein that they are suitable for causing rain, reducing or removing clouds and especially for dispelling fog.

The compounds may be used and are efficient alone or together with other compounds capable of removing fog, especially urea.

The condensation products and mixtures thereof are preferably used in powder form having a particle size of about 1 to 50μ, especially about 5 to 20μ.

The condensation products to be used in accordance with the invention are obtained in known manner by the reaction of naphthalene sulfonic acids, and the said aldehydes or compounds yielding those aldehydes in an acidic aqueous medium at a temperature within the range of from about 60 to 200° C. without pressure or under pressure, when using per mol of naphthalene sulfonic acid about 0.5 to 2.5 mols of aldehyde or the equivalent amount of an aldehyde yielding agent (cf. Houben-Weyl, Methoden der organischen Chemie 4th edition, vol. XIV/2, pages 304, 316).

Suitable naphthalene sulfonic acids are, especially, the β- or α-naphthalene sulfonic acid, corresponding homologs such as the methyl-naphthalene sulfonic acids, and the naphthalene disulfonic acids.

Suitable aldehydes and compounds capable of splitting off such aldehydes are preferably those containing up to 6 carbon atoms in the molecule. There may be mentioned, above all, formaldehyde and compounds splitting off formaldehyde, such as paraformaldehyde, trioxymethylene (trioxane) and hexamethylene-tetramine, further acetaldehyde or paraldehyde, propionaldehyde, butyraldehyde, crotonaldehyde and furfural and the corresponing semi-acetals, especially semi-acetals of lower alkanols.

The reaction of the components is carried out in the aqueous system in the presence of acids, preferably mineral acids, especially sulphuric acid, the pH of the reaction mixture being about 0.2 to 2.2. If the reaction is carried out under pressure, pressures up to about 15 atmospheres gage may be used.

The quantitative ratios of the starting components may be varied within wide limits. Thus it is possible to react per 1 mol of naphthalene sulfonic acid abut 0.2 to 2.5 mols of an aldehyde or the equivalent amount of a compound splitting off said aldehyde. Particularly efficient agents can be prepared when using about 0.5 to 1.2 mol of formaldehyde per mol of naphthalene sulfonic acid. The condensation periods largely depend on the reacted aldehyde. Thus, reaction periods of about 30 minutes are sufficient when using formaldehyde under pressure. For reactions with other aldehydes, about 1 to 10 hours are necessary to complete the condensation. The condensation products obtained as aqueous solutions can easily be pulverized after neutralization with alkali metal hydroxides, alkaline earth metal hydroxides or ammonia by means of known methods, for example spray or roller drying. The neutral condensation products may also be sprayed as aqueous solutions together with other substances capable of removing fog, for example urea.

The compounds to be used in accordance with the invention are, furthermore, distinguished by the fact that they are non-toxic and non-corrosive towards the metal alloys used in automobile and above all in airplane construction.

When using the compounds in admixture with other substances having an influence on the weather and, particularly with those capable of dispelling fog, the portion of the compounds of the invention may be chosen within the range of from about 10 to 90%. Preferably, a mixture of about 20 to 80% of the compounds according to this invention with other components, in particular urea, is used.

In the following, the preparation of the condensation products according to the invention and their use are explained; the parts and percentages being by weight, unless stated otherwise.

CONDENSATION PRODUCT 1

2000 parts of naphthalene were sulfonated at 155–160° C. for 4½ hours with 2000 parts of 98% sulfuric acid. Then the solution was diluted with 1000 parts of water, 1050 parts of 30% aqueous formaldehyde were added to it and the mixture was heated at 115 to 120° C. for 40 minutes under autogenous pressure. Subsequently, after cooling, the condensate was diluted with 2000 parts of water and adjusted at a final pH of 7.0 to 8.0 with 2000 parts of 50% sodium hydroxide solution. Then, the solution was converted into a fine powder by means of spray drying.

CONDENSATION PRODUCT 2

1000 parts of the naphthalene sulfonic acid used for preparing condensation product 1 were heated at 135–140° C. under autogenous pressure with 500 parts of water and 140 parts of 98% acetaldehyde were added during 3 hours, while stirring. Then the condensate was maintained at 135° C. for a further 3 hours, subsequently diluted with 1000 parts of water, neutralized with 540 parts of 50% sodium hydroxide solution and separated from solid impurities by filtration. A fine powder was obtained by spray drying of the filtrate.

CONDENSATION PRODUCT 3

800 parts of β-naphthalene sulfonic acid were heated at 115–120° C. for 3 hours in an autoclave with 300 parts of water and 55 parts of crotonaldehyde. The aqueous condensate was diluted with 2000 parts of water, neutralized with 310 parts of 50% sodium hydroxide solution separated from small amounts of unsoluble impurities by filtration and the filtrate finally converted into a fine powder by means of spray drying.

COMBINATION OF CONDENSATION PRODUCT 1 AND UREA (COMBINATION 1)

40 parts of condensation product 1 were completely dissolved in water with 60 parts of urea and converted as 40% aqueous solution by means of spray drying at 90° C. into a fine powder having essentially a particle size of from 5 to 30μ.

COMBINATION OF CONDENSATION PRODUCT 2 AND UREA (COMBINATION 2)

50 parts of condensation product 2 were thoroughly mixed with 50 parts of urea and ground in an air jet mill (type "Micronizer") having a throughput of 10 kg. per hour in such a manner that a product having a particle size of 10–20μ was obtained.

The condensation products and combinations thereof described in the examples show an excellent efficiency as to the removal of fog.

The dissemination of the condensation product of the invention or combinations thereof in the foggy space to remove the fog may be varied within relatively wide limits of from about 1 mg/m.$^3$ to 100 mg./m.$^3$. It is comprehensive, however, that the effectively required amount must be found, as the case may be, on the basis of meteorological parameters, for example wind speed.

To carry out the process in accordance with the invention different equipments may be used. For example, one or several helicopters or small airplanes may be used for spraying the products of the invention into the fog; alternatively, the particles may be introduced or shot into the fog from the ground, for example with large-sized ventilators or blast apparatuses. Furthermore, pressurized gases such as compressed air, $CO_2$, $N_2$ or low-molecular fluorinated hydrocarbons may also serve as propellants for the compounds of the invention.

EXAMPLE 1

5 g. of the product of combination 1 were introduced into a natural fog in which marked sticks were installed along an axis, the visibility being 3 m. (fog density 2–3 g./m.$^3$), and the temperature being 10° C.; this operation was carried out from a 10 m. altitude started from the first stick in the direction of the axis of the sticks by means of a spraying apparatus also used in agriculture for spraying insecticides. Within about 10 minutes, an improvement of visibility in the fog up to about 18 m. was obtained.

In an analogous manner, the product of combination 2 showed similar good effects.

EXAMPLE 2

In an analogous manner as described in Example 1, 5 g. of condensation product 1 having a particle size of from 10 to 20μ were sprayed in a natural fog having a visibility of 3 m. (fog density 2–3 g./m.$^3$) and a temperature of 10° C. Within about 10 minutes the visibility in the fog was improved up to about 12 m. Condensation products 2 and 3 having a particle size of 10–20μ showed similar good effects.

EXAMPLE 3

The product of combination 2 was sprayed from an airplane by means of a spray system according to the principle of Venturi into a cumulus cloud of 30 to 50 m. thickness in an altitude of about 1000 m. Within a few minutes an air-corridor appeared along the flight path and shortly thereafter the cloud was completely dispelled.

We claim:

1. A process for removing fog or clouds, which comprises contacting the fog or clouds with a water-soluble condensation product of a naphthalene sulfonic acid or a lower alkyl naphthalene sulfonic acid with an aliphatic aldehyde of from 1 to 6 carbon atoms, paraformaldehyde, trioxymethylene, hexamethylene-tetramine, paraldehyde, furfural or a semi-acetal of said aldehyde with a lower alkanol in admixture with about 10 to about 90% of its weight of urea.

2. The process as defined in claim 1 wherein the mixture has particle size in the range of about 1 to about 50μ.

3. A process as defined in claim 1 wherein the fog or clouds are contacted with a water-soluble condensation product of a naphthalene sulfonic acid or a lower alkyl naphthalene sulfonic acid with formaldehyde.

References Cited

UNITED STATES PATENTS

| 2,155,326 | 3/1939 | O'Brien | 8—79 |
| 3,595,477 | 7/1971 | Wollin | 239—2 |
| 2,962,450 | 11/1960 | Elöd et al. | 252—319 |

FOREIGN PATENTS

| 777,700 | 6/1967 | Great Britain | 252—319 |

OTHER REFERENCES

Weather Modification, National Science Foundation, Seventh Ann. Rpt. June 30, 1969 p. 86, and Eighth Ann. Rpt. June 30, 1966 p. 63.

JOHN D. WELSH, Primary Examiner

U.S. Cl. X.R.

239—2